J. PRESCOTT.
GAS MIXER.
APPLICATION FILED SEPT. 30, 1911.
1,031,817.
Patented July 9, 1912.
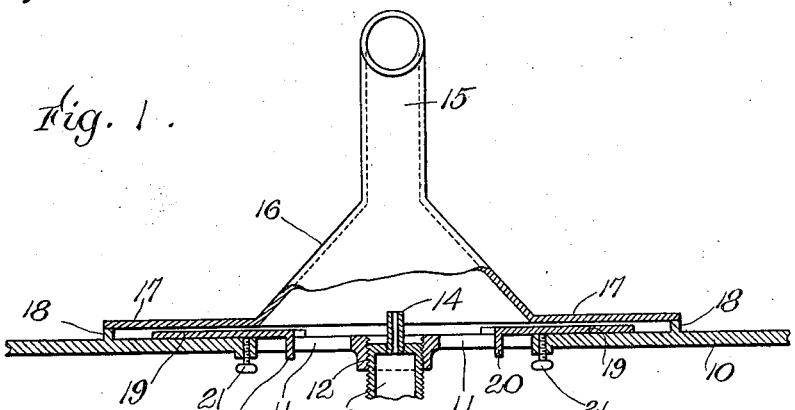
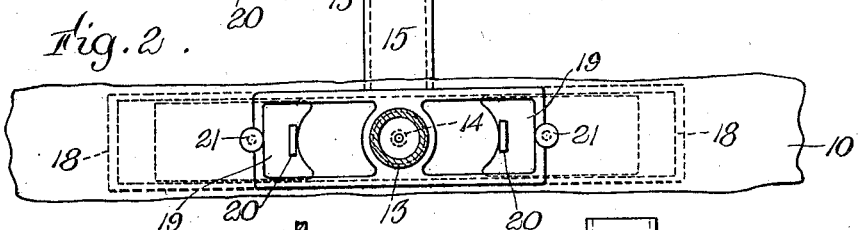
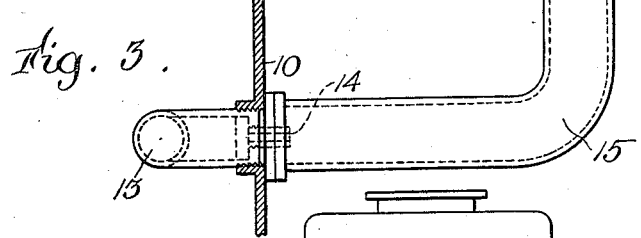
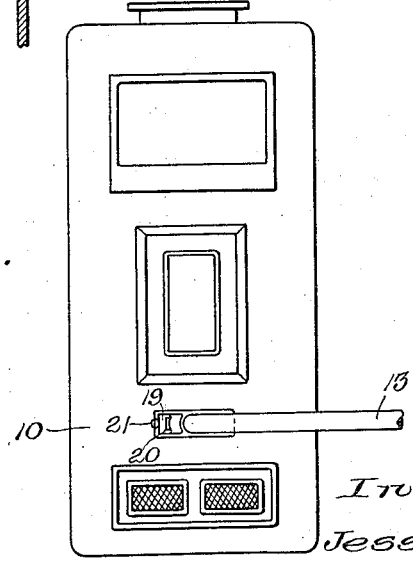
Witnesses:
C. L. Rogers
R. J. Horsey
Inventor:
Jesse Prescott,
by Geo. S. Maxwell,
Attorney.

UNITED STATES PATENT OFFICE.

JESSE PRESCOTT, OF WEBSTER, MASSACHUSETTS.

GAS-MIXER.

1,031,817.     Specification of Letters Patent.     Patented July 9, 1912.

Application filed September 30, 1911. Serial No. 652,137.

*To all whom it may concern:*

Be it known that I, JESSE PRESCOTT, a citizen of the United States, and resident of Webster, county of Worcester, State of Massachusetts, have invented an Improvement in Gas-Mixers, of which the following description, in connection with the accompanying drawings, is a specification, like letters on the drawings representing like parts.

This invention relates to apparatus for mixing air and gas in proper proportions for combustion, and while capable of other and more general uses, is especially designed for various styles of domestic burners.

The invention provides a device adapted to be fitted to the wall of a casing or receptacle and to lie substantially flush with the surface thereof without any projecting parts to accumulate dirt and be in the way. The device is furthermore of the greatest simplicity in construction and capable of having its principal parts readily formed of ordinary stampings.

The invention will be better understood from the following detailed description taken in connection with the accompanying drawings, and will thereafter be pointed out in the appended claims.

Referring to the drawings: Figure 1 is a horizontal transverse section through a portion of a casing with the improved mixer applied thereto. Fig. 2 is a front elevation showing the mixer. Fig. 3 is a transverse vertical section through the casing showing the parts of the mixer in end elevation, and Fig. 4 is an elevation of a domestic burner with the invention applied thereto.

In the illustrative embodiment to be described the vertically extending wall of the casing is designated 10 and at a suitable point is provided with an elongated aperture 11 therethrough. A threaded socket 12 rigid with the casing wall has fitted thereto any suitable gas supply connection 13 terminating in a nipple 14 with a needle passage therethrough. The conduit 15 for the combustible mixture inside the casing is flared out, as seen at 16, to fit over the full length of the aperture 11 in the wall 10 and from the extremities of such flaring portion plate portions 17 extend for some little distance at either side in spaced apart parallelism with the casing wall 10 to receive and guide the air shutters as will be explained. These horizontal plate portions are spaced inward away from the wall 10 by a projecting flange 18 a distance sufficient to permit the air shutter slides 19 to operate and be guided between the plate portion 17 and the casing wall. The air shutters 19, which are thus accurately guided, are of a length so as to be capable of sliding inward from the opposite sides up close to the central socket 12 to entirely close the air opening 11, and the guide ways therefor between the plates 17 and the wall 10 are long enough to permit these shutters to be slid outward so as to fully open the air opening at will. These shutters are preferably provided with suitable handles which may conveniently be formed by turning out lugs 20 at their inner ends. It is also desirable that means be provided for holding the shutters in the desired adjusted positions, and to this end small screw bolts 21 may be tapped through the casing wall near the extremities of the air opening 11.

In Fig. 4 a garbage incinerator is shown conventionally with my improved mixer associated therewith and it will be understood that this is illustrative of a wide variety of uses to which the invention may be applied in many places where it is desirable to avoid the usual outwardly projecting mixer with its attendant objections.

It will be observed that there are no parts of the mixer projecting to any appreciable degree from the outside of the casing to which it is applied, and that on the inside of the casing likewise there are no projecting parts, excepting, of course, the flaring receiver for the combustible mixture.

It is to be understood that the various details of construction are capable of modification without departing from the invention and I therefore do not desire to be limited as to these, except as set forth in the appended claims.

Having described my invention, what I claim as new, and desire to secure by Letters Patent is:

1. A device of the kind described, comprising a wall having an elongated air opening therethrough, a gas connection at one side of said wall, a conduit for a combustible mixture at the other side of said wall, and slides for controlling said air opening at opposite sides thereof, said slides being mounted to lie substantially flush with said wall.

2. A device of the kind described, comprising a wall having an elongated air opening therethrough, a gas connection at one side of said wall, a conduit for a combustible mixture having a flaring receiving opening fitted to the other side of said wall with slide guiding extensions and covering said air opening, and slides for controlling said air opening at opposite sides thereof, said slides being guided between said wall and said extensions from said conduit.

3. A device of the kind described, comprising a casing wall having an elongated air opening therethrough, a gas connection to one side of said wall, a conduit for a combustible mixture fitted at the other side of said wall having a flaring receiving portion to cover said air opening, plate portions extending therefrom in parallel spaced apart relation to said wall, and slides for controlling said air opening at opposite sides thereof guided between the extending portions of said conduit and said wall.

4. A device of the kind described, comprising a casing wall having an elongated air opening therein, a gas connection to one side of said casing, a conduit for a combustible mixture at the other side thereof, and formed to cover said air opening, slides mounted to lie substantially flush with said casing for controlling said air opening and arranged at opposite sides thereof, and means for clamping said slides in desired positions of adjustment.

In testimony whereof, I have signed my name to this specification in the presence of two subscribing witnesses.

JESSE PRESCOTT.

Witnesses:
GEO. H. MAXWELL,
CLYDE L. ROGERS.

---

Copies of this patent may be obtained for five cents each, by addressing the "Commissioner of Patents, Washington, D. C."